Patented July 22, 1952

2,604,455

UNITED STATES PATENT OFFICE 2,604,455

PREPARATION AND REACTIVATION OF FORAMINATE CATALYSTS

Peter William Reynolds and Ralph Lozelu Robinson, Norton-on-Tees, England, assignors to Imperial Chemical Industries Limited, a corporation of Great Britain No Drawing. Application July 26, 1949, Serial No. 106,968. In Great Britain August 13, 1948

17 Claims. (Cl. 252—412)

This invention relates to the preparation of foraminate catalysts.

By the term "foraminate catalyst" as used in this specification is meant one comprising particles or pieces, for example granules prepared by crushing, of an alloy comprising the desired catalytically active metal or metals together with one or more other metals more soluble in acid or alkali or other extracting liquid than the desired catalytically active metal or metals, said alloy comprising at least one phase in which atoms of the desired catalytically active metal or metals and of the aforesaid more soluble metal or metals are on the same crystal lattice and said particles or pieces having a robust core of alloy and an outer active layer having a skeletal structure resulting from the partial or complete removal by the extracting liquid of the more soluble metal or metals from the aforesaid phase or phases in said outer layer. The particles or pieces may be prepared in various ways, for example by crushing the cool alloy, and may be of various sizes, but are preferably 1/8" to 1/4".

It has already been proposed to prepare foraminate copper, nickel, cobalt and iron catalysts from their corresponding alloys with aluminium by treating the alloys with an aqueous alkali.

The aluminium in these alloys is readily attacked by aqueous caustic soda according to the equation:

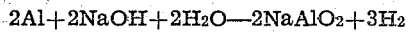

The sodium aluminate thus produced is in equilibrium with aluminium hydroxide and caustic soda:

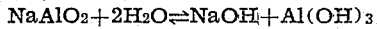

There is therefore a considerable danger that the activity of catalysts prepared by this method will be impaired by the presence of alumina on or near the surface of alumina will have the effect of decreasing the available active surface of the catalyst and so decreasing its activity. It will also in many cases promote undesirable side reactions and in extreme cases the alumina may be sufficient to cause an increased pressure drop through the catalyst bed and to cement together the catalyst granules making their discharge from the converter extremely difficult.

According to the present invention, there is provided a process for the preparation of foraminate catalysts which comprises treating an alloy, as hereinafter defined, with a stream of an aqueous solution of alkali at an uninterrupted space velocity of greater than 10 to remove at least a portion of the aluminium from the surface layers of the alloy, and subsequently, without interruption of flow, replacing the aqueous alkali with a stream of washing liquid comprising water, the velocity of said stream being such as to preclude the deposition of alumina on the activated catalyst.

Alloys suitable for use in the process of this invention are copper-aluminium alloys containing initially 40 to 80 and preferably 50 to 60% copper by weight; nickel-aluminium alloys containing initially 30 to 62 and preferably 30 to 50% nickel by weight; cobalt-aluminium alloys containing initially 15 to 55% and preferably 30 to 50% cobalt by weight; iron-aluminium alloys containing initially 30 to 55% iron by weight.

Suitable aqueous solutions which can be used for the extraction comprise the hydroxides of the alkali metals, but in general caustic soda is preferred. Aqueous caustic soda solutions of from 0.5 to 10% strength by weight are particularly suitable. These may be used at temperatures from atmospheric up to 100° C. or above. It is essential for the process of the present invention that the alkali used for aluminium extraction should have an uninterrupted space velocity greater than 10 and preferably between 20 and 30. In this way the deposition of alumina during the activation is largely prevented. After the extraction of the required quantity of aluminium the stream of aqueous caustic soda is replaced without any interruption of flow, by a stream of liquid suitable for washing the catalyst since this would lead to alumina deposition. The space velocity of the washing liquid may be decreased to a value below 10, but should not be decreased to a value which leads to the deposition of alumina on the catalyst. It is preferred however to maintain the space velocity of the washing liquid at a value greater than 10 until the residual caustic soda and sodium aluminate retained in the free space between the granules have been substantially removed, after which the space velocity of the washing liquid can be altered if desired. In general, suitable washing liquids are those which remove residual caustic soda and sodium aluminate from the activated catalyst, but do not have a deleterious effect upon the catalyst activity, for example by further reaction with the constituents of the alloy. It is possible to employ a wide range of aqueous liquids, but it is preferred to use water itself as the washing liquid. By the term "space velocity" is meant the volume of extracting liquid passing per hour per unit volume occupied by the catalyst in granular form.

Activation and washing may be carried out in a separate vessel and the activated catalyst subsequently introduced into the reactor or the activation may be carried out in the reaction vessel, provided of course, that this is alkali-resistant. Furthermore, the catalysts of the present invention may be reactivated within the reaction vessel by treatment with alkali. In general it is preferred to remove from about 5% to about 30% of the aluminium at each activation. The total aluminium removed should not exceed 70% of the initial aluminium content.

The catalysts of the present invention are particularly active, for example, in processes of hydrogenation, hydrogenolysis dehydrogenation and reductive amination. They may be used in either liquid or vapour phase processes, and they are applicable to either continuous or batch processes.

By the term "hydrogenation" as used in this specification is meant a reaction in which the reacting molecule undergoes an increase in hydrogen content but in which there is no fission of the bond between two atoms in the molecule. Hydrogenation may result in the addition of hydrogen to a multiple bond, for example the conversion of ethylene to ethane, or to a system of multiple bonds whereby their number is decreased, for example the conversion of butadiene to butene-2 and the conversion of benzene to cyclohexane, or it may result in a decrease in the multiplicity of the bond, for example the conversion of acetylene to ethylene. The multiple bond or bonds may join like or unlike atoms, examples being the groups C=C, C=O and C≡N.

By the term "dehydrogenation" is meant a reaction which effects the removal of hydrogen as such. The hydrogen may be removed from a substance giving rise either to the formation of one or more multiple bonds, for example the conversion of propane to propene, ethyl alcohol to acetaldehyde, ethylamine to acetonitrile, or to an increase in the multiplicity of a bond, for example ethylene to acetylene, or to an increase in the number of multiple bonds, for example butene-2 to butadiene. When the formation of multiple bonds gives rise to an aromatic system as in the conversion of cyclohexane to benzene, this type of "dehydrogenation" reaction may be termed "aromatisation." In other forms of the process, "dehydrogenation" is accompanied by the formation of a ring, as in the conversion of hexane to benzene, or by the formation of open chain compounds containing more carbon atoms, as in the conversion of ethylene to butadiene.

By the term "hydrogenolysis" is meant a reaction in which hydrogen addition is accompanied by the fission of one or more bonds in the molecule of the reacting substances. This may lead to fragmentation of the molecule, as in the conversion of benzyl alcohol to toluene and water and the conversion of furfural to sylvan and water, or it may result in the opening of a ring as in the conversion of cyclopropane to propane. The hydrogen which reacts may combine with both atoms formerly joined by the bond as in the examples given above, or it may add to only one of the atoms, as in the conversion of carbon dioxide to carbon monoxide and water.

By the term "reductive amination" is meant the conversion of an aldehyde or a ketone to an amine by reaction with hydrogen in the presence of ammonia or primary or secondary amines, for example the conversion of acetaldehyde to ethylamine according to the equation:

$$CH_3CHO + H_2 + NH_3 \rightarrow CH_3CH_2NH_2 + H_2O$$

Examples 2 and 4 below illustrate the process of the present invention. Examples 1 and 3 are included for comparative purposes.

*Example 1*

10 litres of 1/8" to 1/4" granules of a copper-aluminium alloy in which the ratio by weight copper:aluminium was 55:45 were activated by treatment with 0.4% by weight aqueous caustic soda at 80° C. at a space velocity of 4. After 28 hours 20% of the original aluminium had been removed. The product was washed with cold water for 5 hours. It could be seen that the product was heavily coated with alumina, and this became even more noticeable when the catalyst was dried at 150° C. in air, since the copper surface was blackened.

*Example 2*

A second sample of the alloy used in Example 1 was extracted with 0.4% caustic soda at 80° C. and a space velocity of 30. The removal of 20% by weight of the original aluminium was accomplished in 5 hours. The product after washing with water at a space velocity of 30 was entirely free from any visible coating of alumina.

*Example 3*

10 litres of 1/8" to 1/4" granules of a nickel-aluminium alloy in which the weight ratio nickel:aluminium was 42:58 were treated with 0.4% aqueous caustic soda at 60° C. and a space velocity of 4, to remove 20% by weight of the original aluminium. The product was heavily coated with alumina.

*Example 4*

A second portion of the alloy used in Example 3 was extracted under similar conditions to remove 20% of the original aluminium, except that a space velocity of 25 was employed. The product, after washing with water at the same space velocity was entirely free from visible alumina.

*Example 5*

Catalysts prepared as described in Examples 1 and 2 were used for the vapour phase conversion of iso-propanol to acetone at a temperature of 350° C. The isopropanol was fed to the apparatus with a liquid space velocity of 4. The following results were obtained.

| Catalyst | Per Cent pass yield Propylene | Per Cent pass yield Acetone |
| --- | --- | --- |
| Catalyst prepared in Example 1 | 30.3 | 53.0 |
| Catalyst prepared in Example 2 | 5.8 | 83.2 |

It is evident from these results that the use in the preparation of the catalyst of a high space velocity of extracting alkali leads to the production of a catalyst giving a superior pass yield of acetone and a very much lower pass yield of undesired propylene.

We claim:

1. A process for the preparation of foraminate catalysts which comprises treating an alloy selected from copper-aluminium alloys containing 40 to 80% by weight of copper, nickel-aluminium alloys containing 30 to 62% by weight of nickel, cobalt-aluminium alloys containing 15 to 55% by weight of cobalt, and iron-aluminium alloys containing 30 to 55% by weight of iron, with a stream of an aqueous solution of alkali at an uninterrupted space velocity of greater than 10 to remove at least a portion of the aluminium from the surface layers of the alloy, and subsequently without interruption of flow, replacing the aqueous alkali with a stream of washing liquid comprising water, the velocity of said stream being such as to preclude the deposition of alumina on the activated catalyst.

2. A process for the preparation of foraminate catalysts which comprises treating an alloy selected from copper-aluminium alloys containing 50 to 60% by weight of copper, nickel-aluminium alloys containing 30 to 50% by weight of nickel, cobalt-aluminium alloys containing 30 to 50% by weight of cobalt, and iron-aluminium alloys containing 30 to 55% by weight of iron, with a stream of an aqueous solution of alkali at an uninterrupted space velocity of greater than 10 to remove at least a portion of the aluminium from the surface layers of the alloy, and subsequently without interruption of flow, replacing the aqueous alkali with a stream of washing liquid comprising water, the velocity of said stream being such as to preclude the deposition of alumina on the activated catalyst.

3. A process for the preparation of foraminate catalysts which comprises treating an alloy selected from copper-aluminium alloys containing 40 to 80% by weight of copper, nickel-aluminium alloys containing 30 to 62% by weight of nickel, cobalt-aluminium alloys containing 15 to 55% by weight of cobalt, and iron-aluminium alloys containing 30 to 55% by weight of iron, with a stream of an aqueous solution of alkali at an uninterrupted space velocity of greater than 10 to remove at least a portion of the aluminium from the surface layers of the alloy, and subsequently without interruption of flow, replacing the aqueous alkali with a stream of washing liquid comprising water, the space velocity of said stream being greater than 10, until substantially all of the residual alkali has been removed from the catalyst.

4. A process for the preparation of foraminate catalysts which comprises treating an alloy selected from copper-aluminium alloys containing 40 to 80% by weight of copper, nickel-aluminium alloys containing 30 to 62% by weight of nickel, cobalt-aluminium alloys containing 15 to 55% by weight of cobalt and iron-aluminium alloys containing 30 to 55% by weight of iron, with a stream of an aqueous solution of alkali at an uninterrupted space velocity of from 20 to 30, to remove at least a portion of the aluminium from the surface layers of the alloy, and subsequently without interruption of flow, replacing the aqueous alkali with a stream of washing liquid comprising water, the velocity of said stream being such as to preclude the deposition of alumina on the activated catalyst.

5. A process for the preparation of foraminate catalysts which comprises treating an alloy selected from copper-aluminium alloys containing 50 to 60% by weight of copper, nickel-aluminium alloys containing 30 to 50% by weight of nickel, cobalt-aluminium alloys containing 30 to 50% by weight of cobalt, and iron-aluminium alloys containing 30 to 55% by weight of iron with a stream of an aqueous solution of alkali at an uninterrupted space velocity of from 20 to 30, to remove at least a portion of the aluminium from the surface layers of the alloy, and subsequently without interruption of flow, replacing the aqueous alkali with a stream of washing liquid comprising water, the space velocity of said stream being greater than 10, until substantially all of the residual alkali has been removed from the catalyst.

6. A process for the preparation of foraminate catalysts which comprises treating an alloy selected from copper-aluminium alloys containing 40 to 80% by weight of copper, nickel-aluminium alloys containing 30 to 62% by weight of nickel, cobalt-aluminium alloys containing 15 to 55% by weight of cobalt, and iron-aluminium alloys containing 30 to 55% by weight of iron with a stream of an aqueous solution of alkali at an uninterrupted space velocity of greater than 10 to remove at least a portion of the aluminium from the surface layers of the alloy, and without interruption of flow, subsequently replacing the aqueous alkali with a stream of water, the velocity of said stream being such as to preclude the deposition of alumina on the activated catalyst.

7. A process for the preparation of foraminate catalysts which comprises treating an alloy selected from copper-aluminium alloys containing 50 to 60% by weight of copper, nickel-aluminium alloys containing 30 to 50% by weight of nickel, cobalt-aluminium alloys containing 30 to 50% by weight of cobalt, and iron-aluminum alloys containing 30 to 55% by weight of iron with a stream of an aqueous solution of alkali at an uninterrupted space velocity of greater than 10 to remove at least a portion of the aluminium from the surface layers of the alloy, and subsequently without interruption of flow, replacing the aqueous alkali with a stream of water, the velocity of said stream being such as to preclude the deposition of alumina on the activated catalyst.

8. A process for the preparation of foraminate catalysts which comprises treating an alloy selected from copper-aluminium alloys containing 50 to 60% by weight of copper, nickel-aluminium alloys containing 30 to 50% by weight of nickel, cobalt-aluminium alloys containing 30 to 50% by weight of cobalt, and iron-aluminium alloys containing 30 to 55% by weight of iron with a stream of an aqueous solution of alkali at an uninterrupted space velocity of from 20 to 30, to remove at least a portion of the aluminium from the surface layers of the alloy, and subsequently without interruption of flow, replacing the aqueous alkali with a stream of water, the space velocity of said stream being greater than 10, until substantially all of the residual alkali has been removed from the catalyst.

9. A process for the preparation of foraminate catalysts which comprises treating an alloy selected from copper-aluminium alloys containing 40 to 80% by weight of copper, nickel-aluminium alloys containing 30 to 62% by weight of nickel, cobalt-aluminium alloys containing 15 to 55% by weight of cobalt, and iron-aluminium alloys containing 30 to 55% by weight of iron with a stream of an aqueous solution of 0.5 to 10% by weight sodium hydroxide at an uninterrupted space velocity of greater than 10 to remove at least a portion of the aluminium from the surface layers of the alloy, and subsequently without interruption of flow, replacing the aqueous alkali with a stream of washing liquid comprising water, the velocity of said stream being such as to preclude the deposition of alumina on the activated catalyst.

10. A process for the preparation of foraminate catalysts which comprises treating an alloy selected from copper-aluminium alloys containing 50 to 60% by weight of copper, nickel-aluminium alloys containing 30 to 50% by weight of nickel, cobalt-aluminium alloys containing 30 to 50% by weight of cobalt and iron-aluminium alloys containing 30 to 55% by weight of iron with an aqueous solution of 0.5 to 10% by weight sodium hydroxide at an uninterrupted space velocity of greater than 10 to remove at least a portion of the aluminium from the surface layers of the alloy, and subsequently without interruption of flow, replacing the aqueous alkali with a stream of water, the space velocity of said stream being greater than 10 until substantially all of the residual sodium hydroxide and sodium aluminate have been removed from the catalyst.

11. A process for the preparation of foraminate catalysts which comprises treating an alloy selected from copper-aluminium alloys containing 50 to 60% by weight of copper, nickel-aluminium alloys containing 30 to 50% by weight of nickel, cobalt-aluminium alloys containing 30 to 50% by weight of cobalt and iron-aluminium alloys containing 30 to 55% by weight of iron with an aqueous solution of 0.5 to 10% by weight of sodium hydroxide at an uninterrupted space velocity of from 20 to 30, to remove at least a portion of the aluminium from the surface layers of the alloy, and subsequently without interruption of flow, replacing the aqueous alkali with a stream of water, the velocity of said stream being such as to preclude the deposition of alumina on the activated catalyst.

12. A process for the preparation of foraminate catalysts which comprises treating, at a temperature of from atmospheric to 100° C., an alloy selected from copper-aluminium alloys containing 40 to 80% by weight of copper, nickel-aluminium alloys containing 30 to 62% by weight of nickel, cobalt-aluminium alloys containing 15 to 55% by weight of cobalt, and iron-aluminium alloys containing 30 to 55% by weight of iron with a stream of an aqueous solution of alkali at an uninterrupted space velocity of greater than 10 to remove at least a portion of the aluminium from the surface layers of the alloy, and subsequently without interruption of flow, replacing the aqueous alkali with a stream of washing liquid comprising water, the velocity of said stream being such as to preclude the deposition of alumina on the activated catalyst.

13. A process for the preparation of foraminate catalysts which comprises treating, at a temperature of from atmospheric to 100° C., an alloy selected from copper-aluminium alloys containing 50 to 60% by weight of copper, nickel-aluminium alloys containing 30 to 50% by weight of nickel, cobalt-aluminium alloys containing 30 to 50% by weight of cobalt, and iron-aluminium alloys containing 30 to 55% by weight of iron with a stream of an aqueous solution of alkali at an uninterrupted space velocity of greater than 10 to remove at least a portion of the aluminium from the surface layers of the alloy, and subsequently, without interruption of flow, replacing the aqueous alkali with a stream of washing liquid comprising water, the space velocity of said stream being greater than 10, until substantially all of the residual alkali has been removed from the catalyst.

14. A process for the preparation of foraminate catalysts which comprises treating an alloy selected from copper-aluminium alloys containing 40 to 80% by weight of copper, nickel-aluminium alloys containings 30 to 62% by weight of nickel, cobalt-aluminium alloys containing 15 to 55% by weight of cobalt, and iron-aluminium alloys containing 30 to 55% by weight of iron with a stream of an aqueous solution of alkali at an uninterrupted space velocity of greater than 10 to remove from 5% to 30% by weight of the initial aluminium content, and subsequently, without interruption of flow, replacing the aqueous alkali with a stream of washing liquid comprising water, the velocity of said stream being such as to preclude the deposition of alumina on the activated catalyst.

15. A process for the preparation of foraminate catalysts which comprises treating an alloy selected from copper-aluminium alloys containing 50 to 60% by weight of copper, nickel-aluminium alloys containing 30 to 50% by weight of nickel, cobalt-aluminium alloys containing 30 to 50% by weight of cobalt, and iron-aluminium alloys containing 30 to 55% by weight of iron with an aqueous solution containing 0.5 to 10% by weight of sodium hydroxide at an uninterrupted space velocity of from 20 to 30, to remove from 5 to 30% by weight of the initial aluminium content, and subsequently, without interruption of flow, replacing the aqueous alkali with a stream of water, the space velocity of said stream being greater than 10, until substantially all of the residual sodium hydroxide and sodium aluminate has been removed from the catalyst.

16. A process for the reactivation of foraminate catalysts which comprises treating the deactivated catalyst originally prepared from an alloy selected from copper-aluminium alloys containing 40 to 80% by weight of copper, nickel-aluminium alloys containing 30 to 62% by weight of nickel, cobalt-aluminium alloys containing 15 to 55% by weight of cobalt and iron-aluminium alloys containing 30 to 55% by weight of iron, with a stream of an aqueous solution of alkali, at an uninterrupted space velocity of greater than 10 to remove a further portion of the aluminium without interruption of flow, subsequently replacing the aqueous alkali with a stream of washing liquid comprising water, the velocity of said stream being such to preclude the deposition of alumina on the activated catalyst.

17. A process for the reactivation of foraminate catalysts which comprises treating a deactivated catalyst originally prepared from an alloy selected from copper-aluminium alloys containing 50 to 60% by weight of copper, nickel-aluminium alloys containing 30 to 50% by weight of nickel, cobalt-aluminium alloys containing 30 to 50% of cobalt, and iron-aluminium alloys containing 30 to 55% by weight of iron, with a stream of an aqueous solution of 0.5 to 10% by weight of sodium hydroxide, at an uninterrupted space velocity of from 20 to 30 to remove a further portion of from 5 to 30% by weight of the initial aluminium content of the alloy, without interruption of flow, subsequently replacing the aqueous alkali with a stream of water, the space velocity of said stream being greater than 10, until substantially all of the residual sodium hydroxide and sodium aluminate has been removed from the catalyst.

PETER WILLIAM REYNOLDS.
RALPH LOZELU ROBINSON.

REFERENCES CITED

The following references are of record in the file of this patent:

UNITED STATES PATENTS

| Number | Name | Date |
| --- | --- | --- |
| 2,257,800 | Howk | Oct. 7, 1941 |
| 2,391,283 | Weber | Dec. 18, 1945 |

FOREIGN PATENTS

| Number | Country | Date |
| --- | --- | --- |
| 611,987 | Great Britain | Nov. 5, 1948 |
| 621,749 | Great Britain | Apr. 19, 1949 |

OTHER REFERENCES

Ser. No. 357,989, Brendlein (A. P. C.), published May 25, 1943.